US008902980B2

(12) United States Patent  (10) Patent No.: US 8,902,980 B2
Kim et al.  (45) Date of Patent: Dec. 2, 2014

(54) APPARATUS AND METHOD FOR ENCODING AND DECODING HIGH FIDELITY VIDEO, AND COMPUTER-READABLE STORAGE MEDIUM

(75) Inventors: Yong Hwan Kim, Gyeonggi-do (KR); Joo Young Yi, Gyeonggi-do (KR); Byeong Ho Choi, Gyeonggi-do (KR); Je Woo Kim, Gyeonggi-do (KR); Joon Ki Paik, Gyeonggi-do (KR)

(73) Assignee: Korea Electronics Technology Institute, Seongnam-Si (KR)

( * ) Notice: Subject to any disclaimer, the term of this patent is extended or adjusted under 35 U.S.C. 154(b) by 1655 days.

(21) Appl. No.: 12/234,314

(22) Filed: Sep. 19, 2008

(65) Prior Publication Data

US 2010/0034265 A1 Feb. 11, 2010

(30) Foreign Application Priority Data

Aug. 7, 2008 (KR) .................. 10-2008-0077481

(51) Int. Cl.
*H04N 7/50* (2006.01)
(52) U.S. Cl.
USPC ..................................... 375/240.13
(58) Field of Classification Search
USPC ..................................... 375/240.13
See application file for complete search history.

(56) References Cited

U.S. PATENT DOCUMENTS 5,956,467 A * 9/1999 Rabbani et al. ............. 358/1.9
2003/0215014 A1 * 11/2003 Koto et al. ............... 375/240.16

(Continued)

FOREIGN PATENT DOCUMENTS

KR  10-2005-0009226  1/2005
KR  10-2006-0109844  10/2006
KR  10-2008-0004013  1/2008

OTHER PUBLICATIONS

Korean Office Action issued on Feb. 12, 2010, in corresponding Korean Application No. 10-2008-0077481 (5 pages).

*Primary Examiner* — Gilberto Barron
*Assistant Examiner* — David Le
(74) *Attorney, Agent, or Firm* — Sughrue Mion, PLLC (57) ABSTRACT

Provided are an apparatus and a method for encoding a high fidelity video, and an apparatus and a method for decoding a high fidelity video. A video encoding method for encoding first to third planes having different color components includes performing intra prediction in the first plane or inter prediction between each frame for a block of the first plane, and generating a first residue corresponding to a difference between the block of the first plane and the predicted block of the first plane, predicting a block of the second plane using a reconstructed pixel peripheral to the block of the second plane and a reconstructed pixel peripheral to the block of the first plane corresponding to the reconstructed pixel peripheral to the block of the second plane, and generating a second residue corresponding to a difference between the block of the second plane and the predicted block of the second plane, predicting a block of the third plane using a reconstructed pixel peripheral to the block of the third plane and any one of a reconstructed pixel peripheral to the block of the first plane corresponding to the reconstructed pixel peripheral to the block of the third plane and a reconstructed pixel peripheral to the block of the second plane corresponding to the reconstructed pixel peripheral to the block of the third plane, and generating a third residue corresponding to a difference between the block of the third plane and the predicted block of the third plane, and encoding the first to third residues.

21 Claims, 6 Drawing Sheets

(56) References Cited

U.S. PATENT DOCUMENTS

2004/0028282 A1* 2/2004 Kato et al. .................. 382/236
2005/0013370 A1* 1/2005 Kim et al. ................ 375/240.16
2005/0271288 A1* 12/2005 Suzuki et al. ................. 382/239

* cited by examiner

<VERTICAL CALCULATION MODE>

FIG. 4B

<HORIZONTAL CALCULATION MODE>

FIG. 4C

<DC CALCULATION MODE>

FIG. 4D

<DIAGONAL DOWN-LEFT CALCULATION MODE>

FIG. 5

APPARATUS AND METHOD FOR ENCODING AND DECODING HIGH FIDELITY VIDEO, AND COMPUTER-READABLE STORAGE MEDIUM

CROSS-REFERENCE TO RELATED APPLICATIONS

This application claims the benefit under 35 U.S.C. §119 (a) of a Korean Patent Application No. 10-2008-77481, filed on Aug. 7, 2008 in the Korean Intellectual Property Office, the disclosure of which is incorporated herein by reference in its entirety.

TECHNICAL FIELD

The following disclosure relates to an apparatus and a method for encoding high fidelity video, an apparatus and a method for decoding high fidelity video, and a computer-readable storage medium, and more particularly, to an apparatus and a method for encoding video, an apparatus and a method for decoding video and a computer-readable storage medium, which are capable of enhancing compression efficiency.

BACKGROUND

Generally, most of video coding algorithms are based on an YCbCr color space signal. However, since most of video acquiring and playing apparatuses are based on RGB signals, an RGB color space signal should be converted to a YCbCr color space for YCbCr video coding, and again the YCbCr color space should be converted to an RGB color space for reproduction. This scheme may not be suitable for a high fidelity video field such as a digital cinema, medical video and digital video archiving because the image quality may be deteriorated by a round-off error prevalent in the course of converting a color space.

As requirements for a high fidelity video coding increase more and more, JPEG-2000 and H.264/AVC may directly support the RGB color space signal as well as the existing YCbCr color space signal. Since the RGB color space has a high correlation between R/G/B colors, it is known as an ineffective color space in terms of video compression. On the other hand, since the YCbCr color space is a space in which the correlation between each color is largely reduced, it is mostly used in the video compression application of a general home appliance field. Since H.264/AVC High 4:4:4 Intra/Predictive profile standardized in 2007 supports a coding scheme independently without using the correlation between R/G/B/planes, it is predicted that a compression rate of a RGB video coding may be improved.

SUMMARY

According to an aspect, there is provided an apparatus and a method for encoding a high fidelity video, and an apparatus and a method for decoding a high fidelity video, which are capable of enhancing compression efficiency using the correlation between G, B and R planes.

According to another aspect, there is provided a computer-readable storage medium which stores a program executing a video encoding method capable of enhancing compression efficiency using the correlation between G, B and R planes.

According to still another aspect, there is provided a video encoding method for encoding first to third planes having different color components, the method including performing intra prediction in the first plane or inter prediction between each frame for a block of the first plane, and generating a first residue from a difference between the block of the first plane and the predicted block of the first plane, predicting a block of the second plane using a reconstructed pixel peripheral to the block of the second plane and a reconstructed pixel peripheral to the block of the first plane corresponding to the block of the second plane, and generating a second residue from a difference between the block of the second plane and the predicted block of the second plane, predicting a block of the third plane using a reconstructed pixel peripheral to the block of the third plane and any one of a reconstructed pixel peripheral to the block of the first plane corresponding to the block of the third plane and a reconstructed pixel peripheral to the block of the second plane corresponding to the block of the third plane, and generating a third residue from a difference between the block of the third plane and the predicted block of the third plane, and encoding the first to third residues, respectively.

According to still another aspect, there is provided a video encoding method, including performing intra prediction in a first plane or inter prediction between each frame for a block of the first plane, and generating a first residue from a difference between a block of the first plane and the predicted block of the first plane, predicting a first block of a second plane using a reconstructed pixel peripheral to the first block of the second plane and a reconstructed pixel peripheral to the block of the first plane corresponding to the first block of the second plane, generating a second residue from a difference between the first block of the second plane and the predicted first block of the second plane, and encoding the first and second residues, respectively.

According to still another aspect, there is provided a video encoding apparatus for encoding first and second planes having different color components, including a first plane encoder for encoding the first plane, and a second plane encoder for encoding the second plane, wherein the second encoder includes an inter-plane/intra-plane predicting unit for performing any one of an inter-plane prediction mode, an intra-plane prediction mode and a mixed prediction mode, wherein the inter-plane prediction mode is predicting a first block of the second plane using a reconstructed pixel peripheral to the first block of the second plane and a pixel peripheral to a block of the first plane corresponding to the first block of the second plane, and the intra-plane prediction mode is performing intra prediction in the second plane for the first block of the second plane and the mixed prediction mode is predicting some of the first block of the second plane in the inter-plane prediction mode and predicting others in the intra-plane prediction mode, an inter-frame predicting unit for performing inter prediction between each frame for the first block of the second plane, a subtracting unit for a residue corresponding to a difference between the first block of the second plane and the predicted first block of the second plane, wherein the predicted first block is predicted by the inter-plane/intra-plane predicting unit or the inter-frame predicting unit, and an encoding unit for encoding the residue.

According to still another aspect, there is provided a video decoding method for decoding first to third planes having different color components from a bit stream apparatus, including generating a first residue from the bit stream, performing intra prediction or inter prediction between each frame for a block of the first plane from the first plane reconstructed, and summing the first residue and the predicted block of the first plane to reconstruct the block of the first plane, generating a second residue from the bit stream, predicting a block of the second plane using a reconstructed pixel peripheral to the block of the second plane and a reconstructed pixel peripheral to the block of the first plane corresponding to the block of the second plane, and summing the second residue and the predicted block of the second plane to reconstruct the block of the second plane, and generating a third residue from the bit stream, predicting a block of the third plane using a reconstructed pixel peripheral to the block of the third plane and any one of a reconstructed pixel peripheral to the block of the first plane corresponding to the block of the third plane and a reconstructed pixel peripheral to the block of the second plane corresponding to the block of the third plane, and summing the third residue and the predicted block of the third plane to reconstruct the block of the third plane.

According to still another aspect, there is provided a video decoding apparatus for decoding first and second planes having different color components apparatus, including a first plane decoder for decoding the first plane, and a second plane decoder for decoding the second plane, wherein the second plane decoder includes an inter-plane/intra-plane predicting unit for performing an inter-plane prediction mode which predicts a block of the second plane using a reconstructed pixel peripheral to the block of the second plane and a pixel peripheral to a block of the first plane corresponding to the block of the second plane, an intra-plane prediction mode which performs intra prediction in the second plane for the block of the second plane, and a mixed prediction mode which predicts some of the block of the second plane in the inter-plane prediction mode and predicts others in the intra-plane prediction mode, an inter-frame predicting unit for performing inter prediction between each frame for the block of the second plane, and an adding unit for summing a residue, the block of the second plane and the predicted block of the second plane output from the inter-plane/intra-plane predicting unit or the inter-frame predicting unit to reconstruct the block of the second plane.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, unless otherwise described, the same drawing reference numerals will be understood to refer to the same elements, features, and structures.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness. Terms such as "first" and "second" may be used to describe various elements, but the elements are not limited to the terms. The terms are only used as a purpose of discriminating one element from another element. Terms used herein are merely used for describing specific embodiments. As far as singular expression clearly denotes a different meaning in context, it includes plural expression. It is understood that terms "comprises", "comprising", "includes" or "has" intend to indicate the existence of features, numerals, steps, operations, elements and components described in the present specification or the existence of the combination of these, and do not exclude the existence of one or more other features, numerals, steps, operations, elements and components or the existence of the combination of these or additional possibility beforehand.

Figure 1:
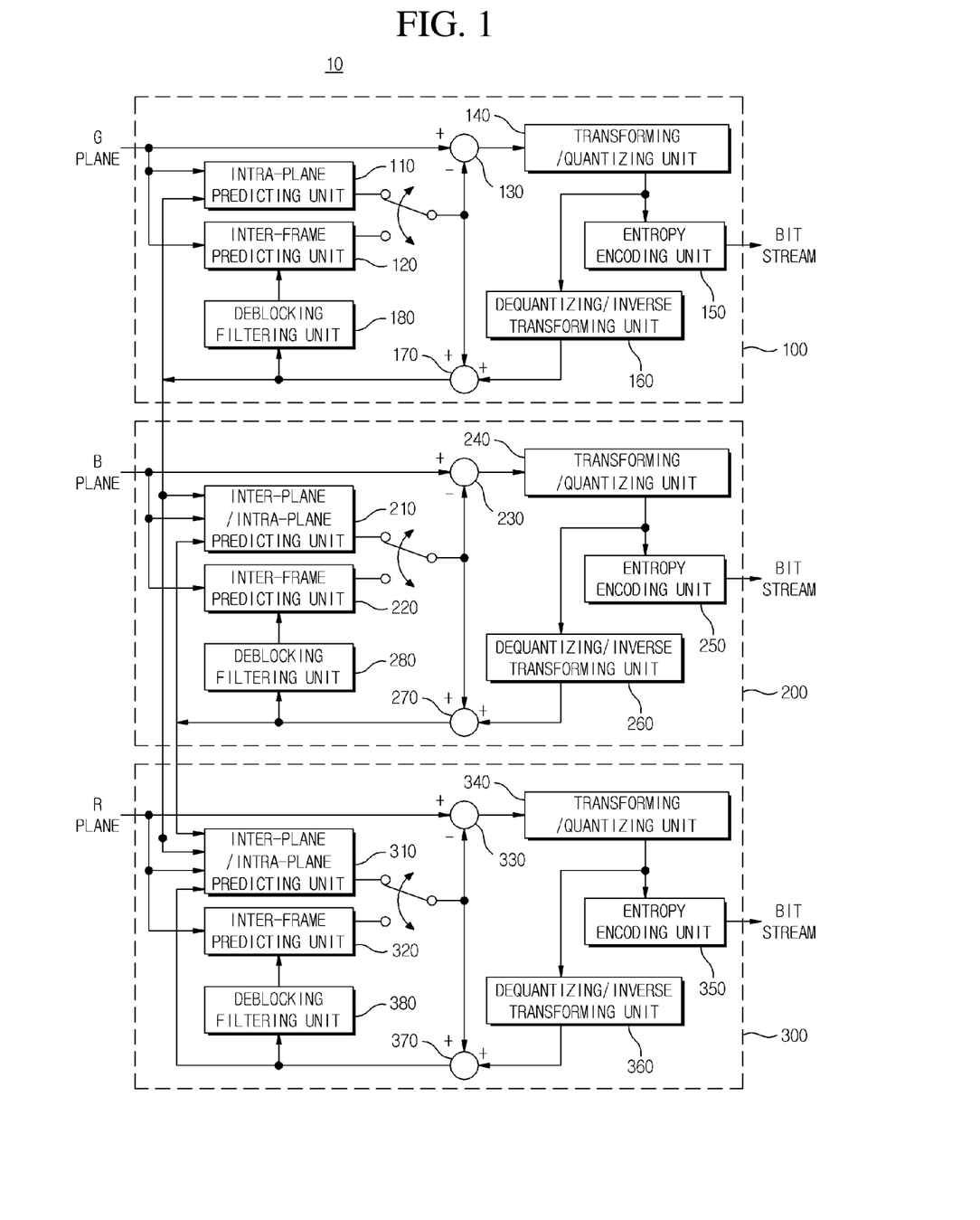
FIG. 1 is a block diagram of a video encoding apparatus according to an exemplary embodiment.
Figure 2:
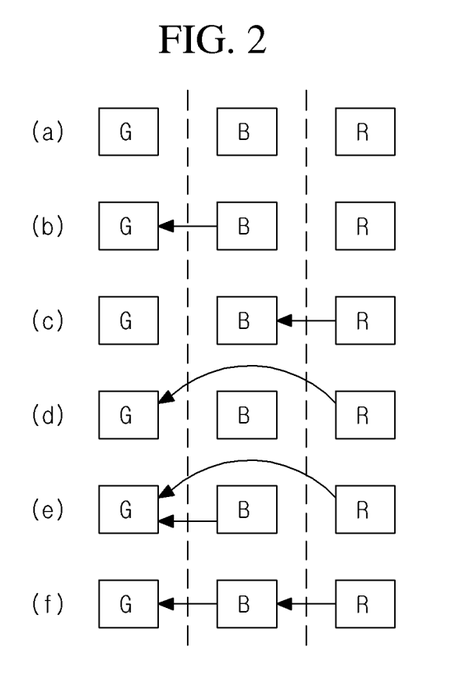
FIG. 2 is a conceptual diagram for describing an operation of a video encoding apparatus of FIG. 1.
Figure 3:
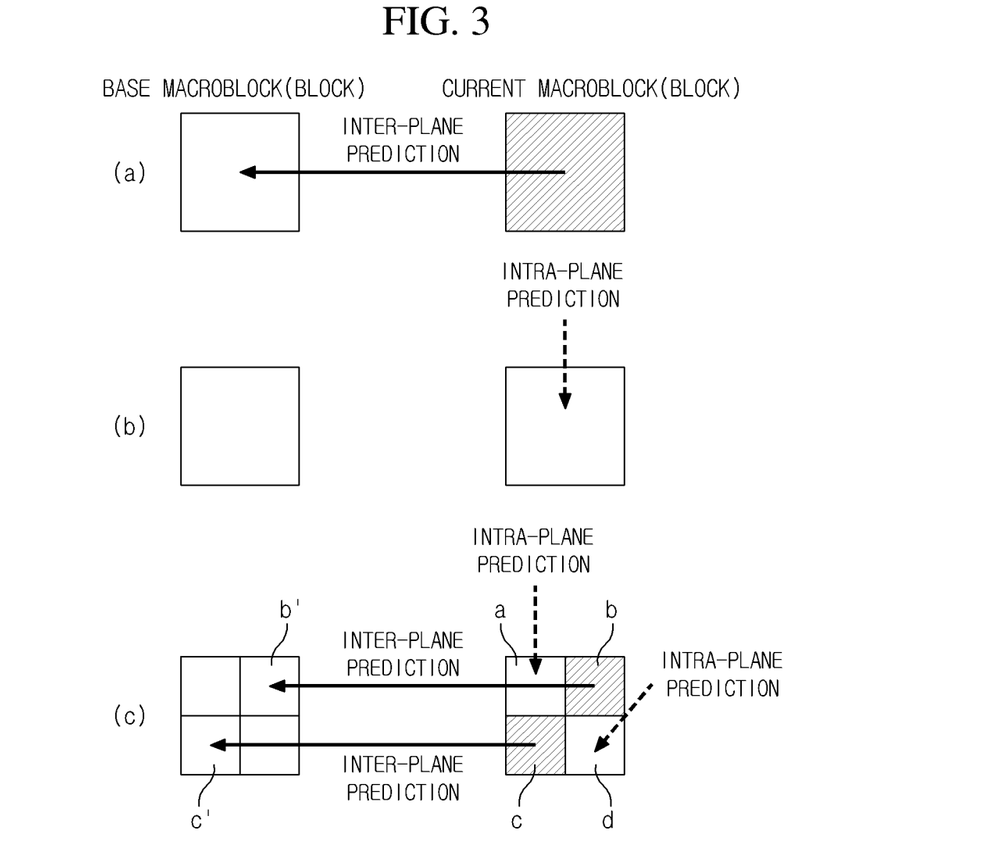
FIG. 3 is a conceptual diagram for describing an operation of an inter-plane/intra-plane prediction unit of FIG. 1.

A video encoding apparatus and a video encoding method according to an exemplary embodiment will be described with reference to FIGS. 1 to 3. FIG. 1 illustrates a video encoding apparatus 10 according to an exemplary embodiment. FIG. 2 illustrates an operation of a video encoding apparatus of FIG. 1. FIG. 3 illustrates an operation of an inter-plane/intra-plane prediction unit of FIG. 1.

Referring to FIG. 1, the video encoding apparatus 10 comprises a first plane encoder 100 for encoding a first plane, a second plane encoder 200 for encoding a second plane, and a third plane encoder 300 for encoding a third plane. Herein, the first plane may be a green (G) plane, the second plane may be a blue (B) plane, and the third pane may be a red (R) plane. Or, the first plane may be a Y plane, the second plane may be a Z plane, and the third pane may be a X plane.

As illustrated in FIG. 2, the video encoding apparatus 10 may operate in six cases of FIGS. 2(a) to (f). Adaptive prediction between planes illustrated in FIGS. 2(a) to (f) may be achieved in a 16×16 macroblock unit, an 8×8 block unit or a 4×4 block unit. FIG. 2(a) illustrates a case where the first to third plane encoders 100, 200 and 300 basically encode the respective first to third planes independently without referring to other planes, FIG. 2(b) illustrates a case where only the second plane encoder 200 encodes the second plane using the correlation between the first plane and the second plane with reference to the first plane, FIG. 2(c) illustrates a case where only the third plane encoder 300 encodes the third plane using the correlation between the second plane and the third plane with reference to the second plane, FIG. 2(d) illustrates a case where only the third plane encoder 300 encodes the third plane using the correlation between the first plane and the third plane with reference to the first plane, FIG. 2(e) illustrates a case where the second plane encoder 200 encodes the second plane using the correlation between the first plane and the second plane with reference to the first plane and the third plane encoder 300 encodes the third plane using the correlation between the first plane and the third plane with reference to the first plane, and FIG. 2(f) illustrates a case where the second plane encoder 200 encodes the second plane using the correlation between the first plane and the second plane with reference to the first plane and the third plane encoder 300 encodes the third plane using the correlation between the second plane and the third plane with reference to the second plane.

That is, the first to third plane encoders 100, 200 and 300 may basically encode the respective first to third planes independently. Moreover, the first plane encoder 100 may encode the first plane without using the correlation between the first plane and the second plane or the correlation between the first plane and the third plane. That is, the G plane may always be a base plane. In the present specification, the base plane (or a base macroblock, a base block) denotes a plane (or a macroblock, a block) which is predicted with reference to other plane (or a macroblock, block). The second plane encoder 200 predicts the second plane using the correlation between the first plane and the second plane with reference to the first plane, and may encode the second plane via the prediction. The third plane encoder 300 predicts the third plane using the correlation between the first plane or the second plane and the third plane with reference to the first plane or the second plane, and may encode the third plane via the prediction. Hereinafter, it is referred to as inter-plane prediction that a current plane (or a base macroblock, a base block) is predicted using the correlation between the current plane and the base plane.

The video encoding apparatus 10 may adaptively perform six cases of FIGS. 2(*a*) to (*f*). Herein, the adaptive performance means that the 16×16 macroblock, 8×8 block and 4×4 block of each plane is encoded in six cases of FIGS. 2(*a*) to (*f*) and one case having good compression efficiency among the encoding cases may be selected.

The video encoding apparatus 10 includes one of the first to third plane encoders 100, 200 and 300 by each plane. Accordingly, in a case where the correlation between one plane and other plane are not used, a parallel process may be basically performed, and consequently encoding speed may increase. Although other plane is used, since only the base macroblock having the same coordinates as those of a current macroblock is approached, a parallel process using a pipeline scheme may always be performed.

Since an exemplary embodiment uses RGB planes, it may prevent the deterioration of an image quality caused by the change between an RGB color space signal and an YCbCr color space, and thus it is suitable for a high fidelity video field such as a digital cinema, medical video and digital video archiving. Moreover, an exemplary embodiment provided herein may enhance compression rate by encoding a plane using the correlation between the second plane and the third plane, in addition to the correlation between the first plane and the second plane and the correlation between the first plane and the third plane.

Hereinafter, for convenience, the first plane is referred to as a G plane, the second plane is referred to as a B plane, and the third plane is referred to as an R plane. The video encoding apparatus 10 will be further described below.

A G plane encoder 100 may comprise an intra-plane predicting unit 110, an inter-frame predicting unit 120, a subtracting unit 130, a transforming/quantizing unit 140, an entropy encoding unit 150, a dequantizing/inverse transforming unit 160, an adding unit 170, and a deblocking filtering unit 180.

The intra-plane predicting unit 110 performs intra prediction in a current G plane. The intra prediction is for removing spatial redundancy in the G plane. To avoid confusion with other term, the intra prediction is referred to as intra-plane prediction below.

The intra-plane predicting unit 110, for example, may predict each of blocks configuring a current plane from adjacent pixels indicated by a prediction direction selected by nine modes for 4×4/8×8 block unit intra prediction and four modes for 16×16 block unit intra prediction. Herein, a size of the each block may variously be determined as 16×16, 8×8, 4×4, etc, and may be adaptively predicted according to each size.

The inter-frame predicting unit 120 performs inter prediction between each frame. The inter prediction is for removing temporal redundancy between a current plane and a reference plane. To avoid confusion with other term, the inter prediction is referred to as inter-frame prediction below.

The inter-frame predicting unit 120 may include a motion estimating unit (not shown) and a motion compensating unit (not shown). The motion estimating unit predicts the motion of a current plane by a block unit on the basis of the reference plane provided from the deblocking filtering unit 180 to thereby calculate a motion vector. That is, the motion compensating unit generates a prediction plane for the current plane from the reference plane using the motion vector calculated by the motion estimating unit. Herein, a size of the each block may variously be determined as 16×16, 16×8, 8×16, 8×8, 8×4, 4×8, 4×4 etc, and may be adaptively predicted according to each size.

The current plane denotes a screen for encoding and decoding a current video, and the reference plane means a plane referred in the encoding or decoding of the current plane. Generally, the reference plane is the past plane of the current plane, but may be the next plane of the current plane or a plurality of planes.

The subtracting unit 130 generates a first residue corresponding to the difference between a current G plane and an intra-plane predicted plane which is generated by the intra-plane predicting unit 110, or generates the first residue corresponding to the difference between the current G plane and an inter-frame predicted plane which is generated by the inter-frame predicting unit 120.

The transforming/quantizing unit 140 converts the first residue from a color space to a frequency space by the subtracting unit 130, and quantizes the converted values. That is, the transforming/quantizing unit 140 divides the converted frequency component values by a quantization parameter, and approximates a result of the division to integer values.

The entropy encoding unit 150 generates a bit stream by entropy encoding values quantized by the transforming/quantizing unit 140, and outputs the bit stream. In H.264/MPEG-4 AVC, context-adaptive variable length coding (CAVLC) and context-adaptive binary arithmetic coding (CABAC) are introduced as an entropy encoding scheme.

The dequantizing/inverse transforming unit 160 dequantizes values quantized by the transforming/quantizing unit 140 to multiply the approximated integer values by the quantized values, thereby reconstructing frequency component values. Furthermore, the dequantizing/inverse transforming unit 160 reconstructs the first residue by transforming the reconstructed frequency component values from a frequency space to a color space.

The adding unit 170 generates a reconstructed G plane corresponding to the sum of an predicted plane generated by the inter-frame predicting unit 120 or the intra-plane predicting unit 110 and the first residue generated by the dequantizing/inverse transforming unit 160.

The deblocking filtering unit 180 reduces the distortion of a block boundary of the reconstructed G plane generated by the adding unit 170, thereby enhancing the image quality of the reconstructed G plane.

The B plane encoder 200 will be described. For convenience, descriptions for elements having the same function as that of the G plane encoder 100 are omitted.

The B plane encoder 200 includes an inter-plane/intra-plane predicting unit 210, an inter-frame predicting unit 220, a subtracting unit 230, a transforming/quantizing unit 240, an entropy encoding unit 250, a dequantizing/inverse transforming unit 260, an adding unit 270, and a deblocking filtering unit 280.

The inter-plane/intra-plane predicting unit 210 adaptively performs inter-plane prediction or intra-plane prediction.

More specifically, the inter-plane/intra-plane predicting unit 210 performs the inter-plane prediction in a 16×16 macroblock unit. Alternatively, the inter-plane/intra-plane predicting unit 210 performs the inter-plane prediction for some of plural 8×8 or 4×4 sub-blocks in the macroblock, and the inter-plane/intra-plane predicting unit 210 performs the intra-plane prediction for others. As described above, the inter-plane prediction means that the current plane is predicted using the correlation with the base plane.

Referring to FIG. 3, as in a case of FIG. 3(*a*), the inter-plane/intra-plane predicting unit 210 may refer to a base macroblock of the G plane being a base plane in a 16×16 macroblock unit and perform the inter-plane prediction using the correlation with the base macroblock being the G plane (inter-plane prediction mode). As in a case of FIG. 3(*b*), the inter-plane/intra-plane predicting unit 210 may perform the intra-plane prediction in the B plane in a 16×16 macroblock unit (intra-plane prediction mode). Where a 16×16 macroblock is divided into a plurality of sub-blocks, for example, 8×8 or 4×4 sub-blocks, the inter-plane/intra-plane predicting unit 210 may perform the inter-plane prediction for some of the 8×8 or 4×4 sub-blocks b and c, and may perform the intra-plane prediction for others a and d (mixed prediction mode). Herein, in the inter-plane prediction mode, the intra-plane prediction mode and the mixed prediction mode, a size of the blocks is not limited to this embodiment and may variously be determined.

In a case of FIG. 3(*b*) where the inter-plane/intra-plane predicting unit 210 performs the intra-plane prediction, since the operation of the inter-plane/intra-plane predicting unit 210 is the same as that of the intra-plane predicting unit 110 of the G plane encoder 100, detail a description thereof is omitted.

In a case of FIG. 3(*a*) where the inter-plane/intra-plane predicting unit 210 performs the inter-plane prediction for the macroblock of the B plane, the inter-plane/intra-plane predicting unit 210 predicts the block of the B plane using a reconstructed pixel peripheral to the block of the B plane and a reconstructed pixel peripheral to the block of the G plane corresponding to that of the B plane. In a case of FIG. 3(*c*) where the inter-plane/intra-plane predicting unit 210 only performs the inter-plane prediction for some sub-blocks b and c and only performs the intra-plane prediction for other sub-blocks a and d, the inter-plane/intra-plane predicting unit 210 performs the inter-plane prediction for the current sub-blocks b and c using a reconstructed pixel peripheral to the base blocks b' and c' of the G plane corresponding to the current sub-blocks b and c. More specifically, the inter-plane/intra-plane predicting unit 210 performs the inter-plane prediction using Equation (1) below.

$$F_B(G')=w \times G'+o \quad (1)$$

where $F_B(\ )$ is a weighted prediction function of the B plane, G' is a reconstructed pixel peripheral to the base block of the G plane which corresponds to the current block of the B plane and is generated by the dequantizing/inverse transforming unit 160 and the adding unit 170, w is a weighting factor, and o is an offset value. The parameters w and o of weighted pixel prediction are calculated using a reconstructed pixel peripheral to the block of the B plane and a reconstructed pixel peripheral to the base block of the G plane corresponding to that of the B plane. In this way, since the inter-plane prediction is performed using the reconstructed pixels and the weighting parameters, the inter-plane prediction may be used together with the term "weighted pixel prediction" below. A method of calculating the parameters w and o of the weighted pixel prediction will be described below with reference to FIGS. 4A to 4D.

The subtracting unit 230 may generate a second residue corresponding to the difference between the current B plane and an inter-plane predicted plane generated by the inter-plane/intra-plane predicting unit 210 (inter-plane prediction mode). The subtracting unit 230 may generate a second residue corresponding to the difference between the current B plane and an intra-plane predicted plane generated by the inter-plane/intra-plane predicting unit 210 (intra-plane prediction mode). The subtracting unit 230 may generate a second residue corresponding to the difference between the current B plane and a mixing predicted plane generated by the inter-plane/intra-plane predicting unit 210 (mixed prediction mode). Alternatively, the subtracting unit 230 may generate a second residue corresponding to the difference between the current B plane and an inter-frame predicted plane generated by the inter-frame predicting unit 220.

The second residue generated by the subtracting 230 is encoded by the transforming/quantizing unit 240 and the entropy encoding unit 250.

The R plane encoder 300 will be described. For convenience, descriptions for elements having the same function as that of the G plane encoder 100 and the B plane encoder 200 are omitted.

The R plane encoder 300 includes an inter-plane/intra-plane predicting unit 310, an inter-frame predicting unit 320, a subtracting unit 330, a transforming/quantizing unit 340, an entropy encoding unit 350, a dequantizing/inverse transforming unit 360, an adding unit 370, and a deblocking filtering unit 380.

As described above for the B plane encoder 200, the inter-plane/intra-plane predicting unit 310 adaptively performs inter-plane prediction or intra-plane prediction. The inter-plane/intra-plane predicting unit 310 performs the inter-plane prediction for some of plural 8×8 or 4×4 sub-blocks in a 16×16 macroblock, and the inter-plane/intra-plane predicting unit 310 performs the intra-plane prediction for others.

Referring to FIG. 3, the inter-plane/intra-plane predicting unit 310 predicts the R plane according to a case of FIG. 3(*a*) (inter-plane prediction mode), a case of FIG. 3(*b*) (intra-plane prediction mode) and a case of FIG. 3(*c*) (mixed prediction mode). Herein, a base plane is the G plane or the R plane, may be adaptively predicted with reference to the G plane or the R plane, or may be predicted as a plane which is determined as any one.

In a case where the inter-plane/intra-plane predicting unit 310 performs the intra-plane prediction, since the operation of the inter-plane/intra-plane predicting unit 310 is the same as that of the intra-plane predicting unit 110 of the G plane encoder 100, a description thereof is omitted.

In a case where the inter-plane/intra-plane predicting unit 310 performs the inter-plane prediction for a block having a certain size of the B plane, the inter-plane/intra-plane predicting unit 310 predicts the block of the R plane using a reconstructed pixel peripheral to the block of the R plane and a reconstructed pixel peripheral to the base block of the B plane (or G plane) corresponding to that of the R plane. More specifically, the inter-plane/intra-plane predicting unit 310 performs the weighted pixel prediction using Equation (2) below.

$$F_R(G')=w \times G'+o,$$

or $$F_R(B')=w \times B'+o \quad (2)$$

where $F_R(\ )$ is a weighted prediction function of the R plane, G' (or B') is a reconstructed pixel peripheral to the base block of the G (or B) plane which corresponds to the current block of the R plane and is generated by the dequantizing/inverse transforming unit 360 and the adding unit 370, w is a weighting factor, and o is an offset value. The parameters w and o of the weighted pixel prediction are calculated using a reconstructed pixel peripheral to the block of the B plane and a reconstructed pixel peripheral to the base block of the G (or B) plane corresponding to that of the B plane. A method of calculating the parameters w and o of the weighted pixel prediction will be described below with reference to FIGS. 4A to 4D.

The subtracting unit 330 may generate a third residue corresponding to the difference between the current R plane and an inter-plane predicted plane generated by the inter-plane/intra-plane predicting unit 310 (inter-plane prediction mode). The subtracting unit 330 may generate a third residue corresponding to the difference between the current R plane and an intra-plane predicted plane generated by the inter-plane/intra-plane predicting unit 310 (intra-plane prediction mode). The subtracting unit 330 may generate a third residue corresponding to the difference between the current R plane and a mixing predicted plane generated by the inter-plane/intra-plane predicting unit 310 (mixed prediction mode). Alternatively, the subtracting unit 330 may generate a third residue corresponding to the difference between the current R plane and an inter-frame predicted plane generated by the inter-frame predicting unit 320.

The third residue generated by the subtracting 330 is encoded by the transforming/quantizing unit 340 and the entropy encoding unit 350.

Accordingly, a video encoder according to an exemplary embodiment may adaptively encode a plane using the correlation between a B plane and an R plane, thereby enhancing the compression efficiency.

Hereinafter, a method for calculating the parameters w and o of the weighted pixel prediction in the inter-plane/intra-plane predicting unit 210 will be described with reference to FIGS. 4A to 4D. In the method, the inter-plane/intra-plane predicting unit 210 of the B plane encoder (or R plane encoder) calculates the parameters w and o of the weighted pixel prediction using a pixel peripheral to the block of the B plane (or R plane, referred to as a current plane below) and a pixel peripheral to the G plane (or R plane, G plane, referred to as a base plane below) corresponding to that of the B plane.

FIGS. 4A to 4D are a conceptual diagram for describing four calculation modes for calculating the parameters w and o of the weighted pixel prediction according to an exemplary embodiment.

The parameters w and o of the weighted pixel prediction may be calculated by a mean square error (MSE) minimum scheme expressed as Equations (3), (4) and (5) below.

$$F(p_{1i}) = p_{0i} = wp_{1i} + o, \quad (3)$$

$$e = \sum_{i=0}^{M}(p_{0i} - w \times p_{1i} - o)^2,$$

$$\frac{\partial e}{\partial w} = \sum_{i=0}^{M}(2w \times p_{1i}^2 - 2p_{0i} \times p_{1i} + 2p_{1i} \times 0) \to 0,$$

$$\frac{\partial e}{\partial o} = 2M \times o - \sum_{i=0}^{M}(2p_{0i} - 2w \times p_{1i}) \to 0,$$

-continued $$w = \frac{M \times \sum_{i=0}^{M}(p_{0i} \times p_{1i}) - \sum_{i=0}^{M}p_{0i} \times \sum_{i=0}^{M}p_{1i}}{M \times \sum_{i=0}^{M}p_{1i}^2 - \left(\sum_{i=0}^{M}p_{1i}\right)^2} \quad (4)$$

$$o = \frac{\sum_{i=0}^{M}p_{0i} \times \sum_{i=0}^{M}p_{1i}^2 - \sum_{i=0}^{M}(p_{0i} \times p_{1i}) \times \sum_{i=0}^{M}p_{1i}}{M \times \sum_{i=0}^{M}p_{1i}^2 - \left(\sum_{i=0}^{M}p_{1i}\right)^2} \quad (5)$$

$$= \frac{1}{M}\left(\sum_{i=0}^{M}p_{0i} - w \times \sum_{i=0}^{M}p_{1i}\right)$$

where the Equations (4) and (5) are derived from the Equation (3). $p_{0i}$ is a reconstructed pixel peripheral to the current block of a current plane, phi is a reconstructed pixel peripheral to the base block of a base plane, and M is the number of $p_{0i}$ or $p_{1i}$. As illustrated in FIGS. 4A to 4D, $p_{0i}$, $p_{1i}$ and M may be determined according to four calculation modes, wherein M means the number of pixels necessary for calculation.

Figure 4A:
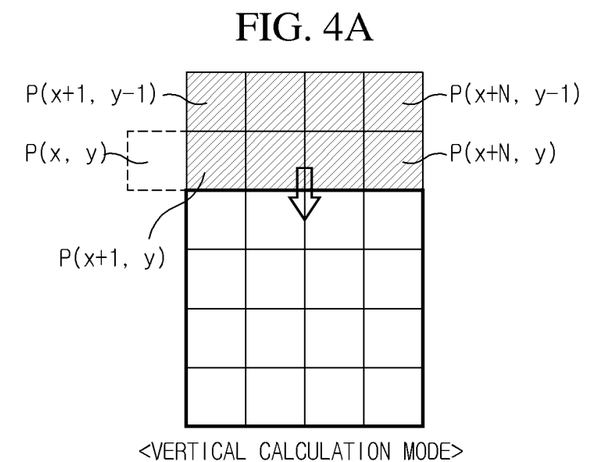
FIGS. 4A to 4D are conceptual diagrams for describing four calculation modes for calculating parameters w and o of a weighted pixel prediction according to an exemplary embodiment.

As illustrated in FIG. 4A, the parameters w and o of the weighted pixel prediction may be calculated in a vertical calculation mode. In the following equations, N means a size of a block (4, 8 or 16).

In the vertical calculation mode, if $p_1(x+1, y)$ is available, M=2N, and $p_{0i}$ and $p_{1i}$ may be determined as the following equations.

$$p_{1i} = p_1(x+1,y) \ldots p_1(x+N,y), p_1(x+1,y-1) \ldots p_1(x+N, y-1)$$

$$p_{0i} = p_0(x+1,y) \ldots p_0(x+N,y), p_0(x+1,y-1) \ldots p_0(x+N, y-1)$$

The parameters w and o of the weighted pixel prediction is calculated by substituting $p_{0i}$, $p_{1i}$ and M for the Equations (4) and (5).

If $p_1(x+1, y)$ is not available, the vertical calculation mode is not used.

Figure 4B:
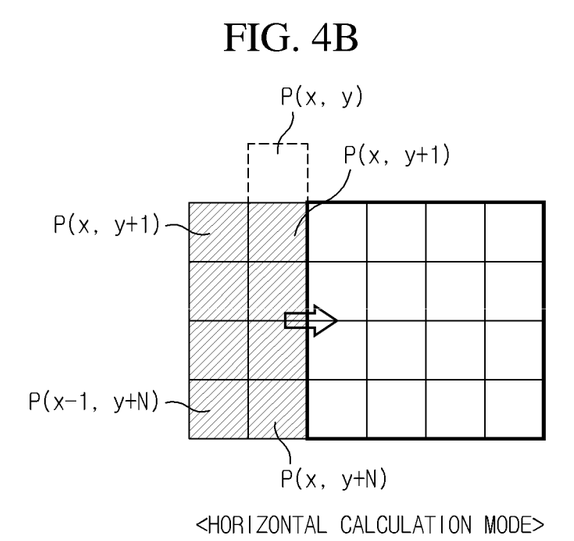

As illustrated in FIG. 4B, the parameters w and o of the weighted pixel prediction may also be calculated by a horizontal calculation mode.

In the horizontal calculation mode, if $p_1(x+1, y)$ is available, M=2N, and $p_{0i}$ and $p_{1i}$ may be determined as the following equations.

$$p_{1i} = p_1(x,y+1) \ldots p_1(x,y+N), p_1(x-1,y+1) \ldots p_1(x-1, y+N)$$

$$p_{0i} = p_0(x,y+1) \ldots p_0(x,y+N), p_0(x-1,y+1) \ldots p_0(x-1, y+N)$$

The parameters w and o of the weighted pixel prediction is calculated by substituting $p_{0i}$, $p_{1i}$ and M for the Equations (4) and (5).

If $p_1(x+1, y)$ is not available, the horizontal calculation mode is not used.

Figure 4C:
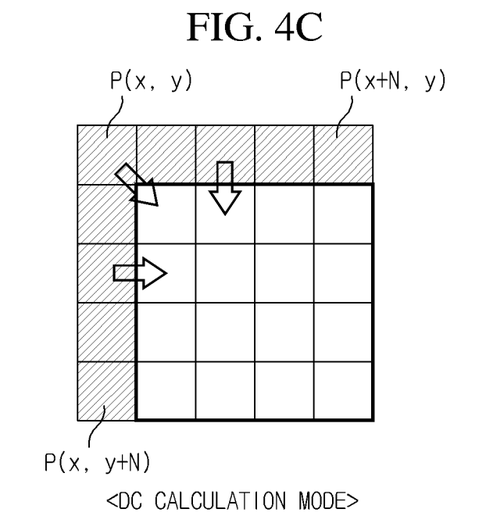

As illustrated in FIG. 4C, the parameters w and o of the weighted pixel prediction may also be calculated by a DC calculation mode.

In the DC calculation mode, if $p_1(x, y)$ is available, M=2N+1, and $p_{0i}$ and $p_{1i}$ can be determined as the following equations.

$$p_{1i}=p_1(x,y),p_1(x+1,y)\ldots p_1(x+N,y),p(x,y+1)\ldots p_1(x,y+N)$$

$$p_{0i}=p_0(x,y),p_0(x+1,y)\ldots p_0(x+N,y),p_0(x,y+1)\ldots p_0(x,y+N)$$

The parameters w and o of the weighted pixel prediction is calculated by substituting $p_{0i}$, $p_{1i}$ and M for the Equations (4) and (5).

If $p_1(x, y)$ is not available and $p_1(x+1, y)$ is available, $M=N+(N/2)$, and $p_{0i}$ and $p_{1i}$ may be determined as the following equations.

$$p_{1i}=p_1(x+1,y)\ldots p_1(x+1,y),p_1(x+1,y)\ldots p_1(x+N,y)$$

$$p_{0i}=p_0(x+1,y)\ldots p_0(x+1,y),p_0(x+1,y)\ldots p_0(x+N,y)$$

where the number of $p_1(x+1, y)$ and $p_0(x+1, y)$ are equal to $(N/2)+1$, respectively.

The parameters w and o of the weighted pixel prediction is calculated by substituting $p_{0i}$, $p_{1i}$ and M for the Equations (4) and (5).

If $p_1(x, y)$ and $p_1(x+1, y)$ are not available, and $p_1(x, y+1)$ is available, $M=(N/2)+1$, and $p_{0i}$ and $p_{1i}$ may be determined as the following equations.

$$p_{1i}=p_1(x,y+1)\ldots p_1(x,y+1),p_1(x,y+1)\ldots p_1(x,y+N)$$

$$p_{0i}=p_0(x,y+1)\ldots p_0(x,y+1),p_0(x,y+1)\ldots p_0(x,y+N)$$

where the number of $p_1(x, y+1)$ and $p_0(x, y+1)$ are equal to $(N/2)+1$, respectively.

The parameters w and o of the weighted pixel prediction is calculated by substituting $p_{0i}$, $p_{1i}$ and M for the Equations (4) and (5).

If $p_1(x, y)$, $p_1(x+1, y)$, and $p_0(x, y+1)$ are not available, the DC calculation mode is not used.

Figure 4D:
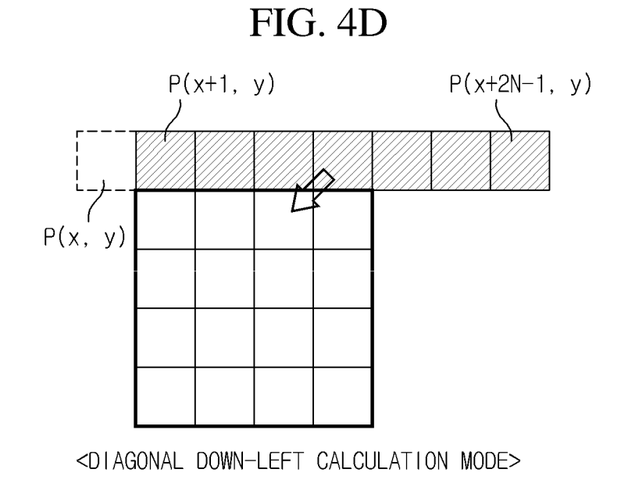

As illustrated in FIG. 4D, the parameters w and o of the weighted pixel prediction may be calculated by a diagonal down-left calculation mode.

In the diagonal down-left calculation mode, if $p_1(x+1, y)$ and $p_1(x+N+1, y)$ are available, $M=2N-1$, and $p_{0i}$ and $p_{1i}$ may be determined as the following equations.

$$p_{1i}=p_1(x+1,y)\ldots p_1(x+2N-1,y)p_{0i}=p_0(x+1,y)\ldots p_0(x+2N-1,y)$$

The parameters w and o of the weighted pixel prediction is calculated by substituting $p_{0i}$, $p_{1i}$ and M for the Equations (4) and (5).

If $p_1(x+1, y)$ is available and $p_1(x+N+1, y)$ is not available, $M=2N-1$, and $p_{0i}$ and $p_{1i}$ may be determined as the following equations.

$$p_{1i}=p_1(x+1,y)\ldots p_1(x+N,y),p_1(x+N,y)\ldots p_1(x+N,y)$$

$$p_{0i}=p_0(x+1,y)\ldots p_0(x+N,y),p_0(x+N,y)\ldots p_0(x+N,y)$$

where the number of $p_1(x+N, y)$ and $p_0(x+N, y)$ are equal to N, respectively.

The parameters w and o of the weighted pixel prediction is calculated by substituting $p_{0i}$, $p_{1i}$ and M for the Equations (4) and (5).

If $p_1(x+1, y)$ and $p_1(x+N+1, y)$ are not available, the diagonal down-left calculation mode is not used.

In FIGS. 4A to 4D, a 4×4 block size has been described as an example, but a size of a block is not limited to this embodiment. If a block size other than the 4×4 block size is applied, the number of $P_{0i}$, the number of $p_{1i}$ and the number of M may be varied. It is understood that the predictions according to an exemplary embodiment may be adaptively performed in accordance with a size of a block.

The weighted prediction function $F_B(G')$ of the B plane and the weighted prediction function $F_R(G')$ or $F_R(B')$ of the R plane are determined through the parameters w and o of the weighted pixel prediction calculated by the above-described method. The subtracting unit 230 of the B plane encoder 200 generates a second residue $R_B$ through "$R_B=B-F_B(G')$". Moreover, the subtracting unit 330 of the R plane encoder 300 generates a third residue $R_{RG}$ or $R_{RB}$ through "$R_{RG}=R-F_R(G')$" or "$R_{RB}=R-F_R(B')$".

Accordingly, the respective encoders 100, 200 and 300 generate and encode the first to third residues using the correlation between each plane. Thus, compression rate may be enhanced. As described above, an exemplary embodiment need not separately transmit the parameters of the weighted pixel prediction to the each encoder by performing weighted prediction using pixels peripheral to the current plane and the base plane, thereby enhancing the compression efficiency. A description will follow regarding an exemplary method of decoding in each decoder without receiving the parameters of the weighted pixel prediction from the each encoder.

The following Table 1 shows a macroblock prediction syntax proposed to integrate certain embodiments disclosed herein with H.264/AVC. New added syntaxes are rem_intra4×4_pred_mode2 and rem_intra8×8_pred_mode2.

TABLE 1

```
mb_pred(mb_type) {
    if(MbPartPredMode(mb_type, 0)=Intra_4x4 ||
        MbPartPredMode(mb_type, 0)=Intra_8x8 ||
        MbPartPredMode(mb_type, 0)=Intra_16x16) {
        if(MbPartPredMode(mb_type, 0)=Intra_4x4) {
            for(luma4x4BlkIdx=0; luma4x4BlkIdx<16; luma4x4BlkIdx++) {
                prev_intra4x4_pred_mode_flag[luma4x4BlkIdx];              u(1) | ae(v)
                if(!prev_intra4x4_pred_mode_flag[luma4x4BlkIdx]) {
                    if(clour_plane_id=0)
                        rem_intra4x4_pred_mode[luma4x4BlkIdx];            u(3) | ae(v)
                    else
                        rem_intra4x4_pred_mode[luma4x4BlkIdx];            u(4) | ae(v)
                }
            }
        }
        if(MbPartPredMode(mb_type, 0)=Intra_8x8) {
            for(luma8x8BlkIdx=0; luma8x8BlkIdx<4; luma8x8BlkIdx++) {
                prev_intra8x8_pred_mode_flag[luma8x8BlkIdx];              u(1) | ae(v)
                if(!prev_intra8x8_pred_mode_flag[luma8x8BlkIdx]) {
                    if(clour_plane_id=0)
                        rem_intra8x8_pred_mode[luma8x8BlkIdx];            u(3) | ae(v)
                    else
                        rem_intra8x8_pred_mode2[luma8x8BlkIdx];           u(4) | ae(v)
                }
```

TABLE 1-continued

```
        }
            ... // the same as the existing syntax
        }
        ... // the same as the existing syntax
}
``` rem_intra4×4_pred_mode2 is 4 bits, and represents an intra-plane prediction mode and an inter-plane prediction mode. Although a prediction mode representable by 4 bits is 0-15, a prediction mode of 0-16 may be represented by prev_intra4×4_pred_mode_flag.

Nine prediction modes 0-8 have the same meaning as the existing H.264/AVC intra prediction mode. Four prediction modes 9-12 denote the weighted pixel prediction of the B plane (or R plane) from the G plane (or B plane), and represent the vertical calculation mode, the horizontal calculation mode, the DC calculation mode and the diagonal down-left calculation mode in order. Herein, a base plane ID equals to a current plane ID minus 1. Four prediction modes 13-16 denote the weighted pixel prediction of the R plane from the G plane, and represent the vertical calculation mode, the horizontal calculation mode, the DC calculation mode and the diagonal down-left calculation mode in order. Herein, a base plane ID equals to a current plane ID minus 1, and thus may be used only the R plane. Accordingly, the base plane may necessarily become the G plane.

Although rem_intra8×8_pred_mode2 has the same meaning as that of rem_intra4×4_pred_mode2, it differs from rem_intra4×4_pred_mode2 in that it is applied when a type of a macroblock is Intra_8×8.

Accordingly, each of the encoders 100, 200 and 300 may inform an inter-plane prediction mode to each decoder using a flag signal, for example, rem_intra4×4_pred_mode2 and rem_intra8×8_pred_mode2. In this case, there is no need to transmit the parameters of the weighted pixel prediction to each decoder separately.

Even when a type of a macroblock is Intra_16×16, the weighted prediction mode is added. However, since the existing Cb/Cr-related syntax without being used is reused in the H.264/AVC independent mode, there is no need to change the syntax, and only the change of semantics is required.

The following Table 2 shows the changed meaning of an intra prediction mode of Intra_16×16. The following Table 2 is H.264/AVC standard document (ITU-T Rec. H.264, Advanced video coding for generic audiovisual services, ITU-T, March 2005) that is redefined by inserting a weighted prediction mode between each plane after deleting a chroma-related syntax, which is not used in the independent mode, in a table 7-11 of the H.264/AVC standard document. In the following Table 2, cbp means a coded block pattern.

TABLE 2

| Mb_type | prediction mode | CodeBlockPattern | Semantics |
| --- | --- | --- | --- |
| 1 | 0 | 0 | Intra prediction mode in a plane (cbp = 0) |
| 2 | 1 | 0 | |
| 3 | 2 | 0 | |
| 4 | 3 | 0 | |
| 5 | 4 | 0 | Weighted pixel prediction mode between each plane [base plane ID = current plane ID − 1] (B/R plane; cbp = 0) |
| 6 | 5 | 0 | |
| 7 | 6 | 0 | |
| 8 | 7 | 0 | |

TABLE 2-continued

| Mb_type | prediction mode | CodeBlockPattern | Semantics |
| --- | --- | --- | --- |
| 9 | 8 | 0 | Weighted pixel prediction mode between each plane [base plane ID = current plane ID − 2 = 0] (R plane; cbp = 0) |
| 10 | 9 | 0 | |
| 11 | 10 | 0 | |
| 12 | 11 | 0 | |
| 13 | 0 | 15 | Intra prediction mode in a plane (cbp = 15) |
| 14 | 1 | 15 | |
| 15 | 2 | 15 | |
| 16 | 3 | 15 | |
| 17 | 4 | 15 | Weighted pixel prediction mode between each plane [base plane ID = current plane ID − 1] (B/R plane; cbp = 15) |
| 18 | 5 | 15 | |
| 19 | 6 | 15 | |
| 20 | 7 | 15 | |
| 21 | 8 | 15 | Weighted pixel prediction mode between each plane [base plane ID = current plane ID − 2 = 0] (R plane; cbp = 15) |
| 22 | 9 | 15 | |
| 23 | 10 | 15 | |
| 24 | 11 | 15 | |

A video decoding apparatus 20 and a video decoding method according to an exemplary embodiment will be described with reference to FIG. 5.

Figure 5:
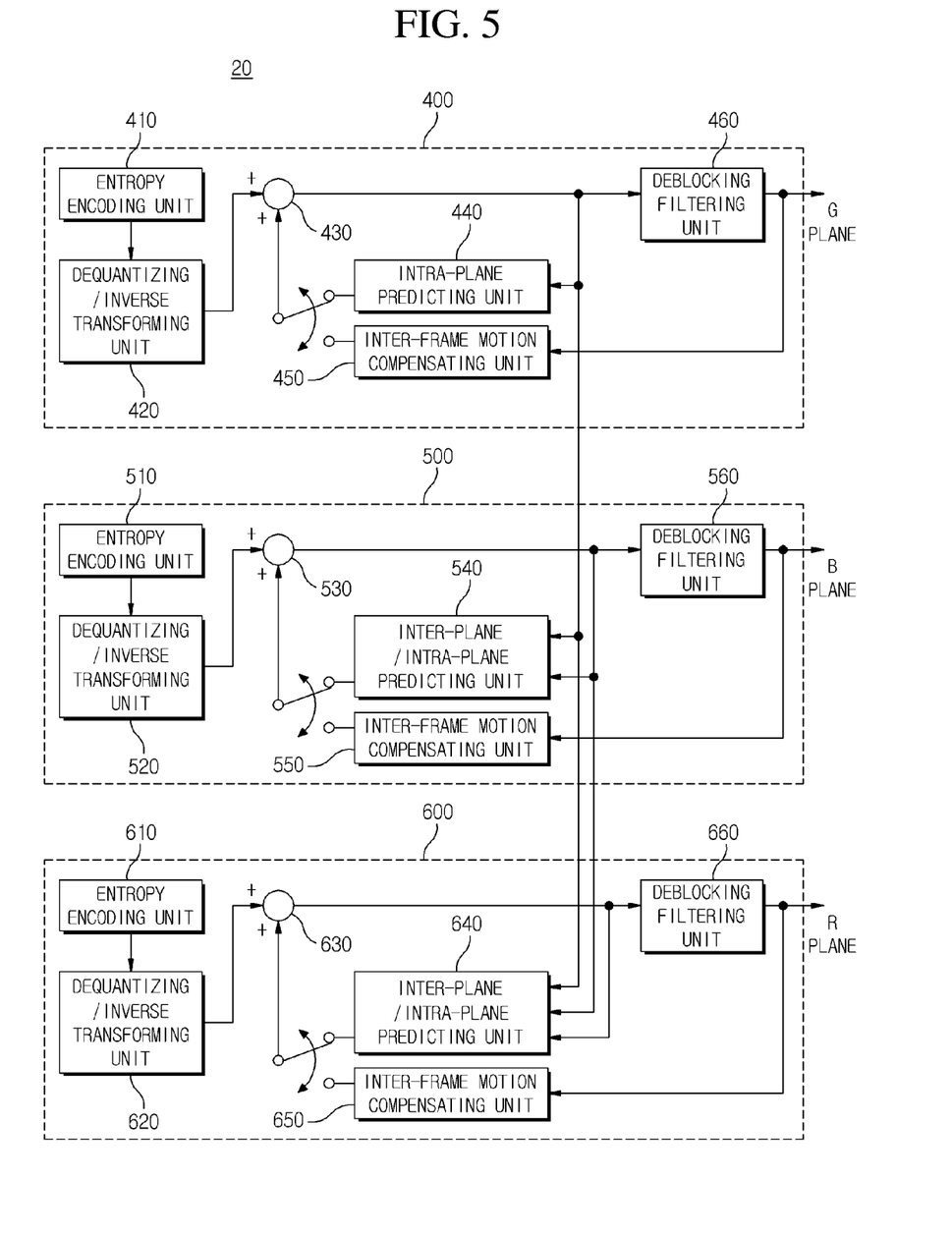
FIG. 5 is a block diagram for describing a video decoding apparatus and a video decoding method according to an exemplary embodiment.

Referring to FIG. 5, the video decoding apparatus 20 comprises a G plane decoder 400, a B plane decoder 500, and an R plane decoder 600.

The G plane decoder 400 includes an entropy decoding unit 410, a dequantizing/inverse transforming unit 420, an adding unit 430, an intra-plane predicting unit 440, an inter-frame motion compensating unit 450, and a deblocking filtering unit 460.

The entropy decoding unit 410 reconstructs integer values by entropy decoding a bit stream output from the video encoding apparatus 10 of FIG. 1.

The dequantizing/inverse transforming unit 420 reconstructs frequency component values by dequantizing integer values reconstructed by the entropy decoding unit 410, and reconstructs a first residue of a G color component from a frequency space with the reconstructed frequency component values.

The intra-plane predicting unit 440 predicts blocks constituting a current G plane from adjacent pixels in a G plane reconstructed by the adding unit 430 and generates a prediction plane configured with the predicted blocks, according to an intra prediction mode in the G plane decoder 100.

The inter-frame motion compensating unit 450 compensates a reference plane generated in the deblocking filtering unit 460 and motion between each current plane. Such an inter-frame motion compensating unit 450 includes a motion compensating unit (not shown), and generates a prediction plane for the current plane from the reference plane using a motion vector used in the G plane encoder 100 in a block unit of size used in the G plane encoder 100.

The adding unit 430 sums the prediction plane generated by the intra-plane predicting unit 440 or the inter-frame motion compensating unit 450 and the first residue reconstructed by the dequantizing/inverse transforming unit 420 to thereby reconstruct the G plane.

The deblocking filtering unit 460 reduces deterioration occurring in a block boundary of the G plane reconstructed by the adding unit 430, thereby enhancing image quality for a reconstructed plane.

The B plane decoder 500 will be described below. For convenience, descriptions for elements having the same function as that of the G plane decoder 400 are omitted.

The B plane decoder 500 includes an entropy decoding unit 510, a dequantizing/inverse transforming unit 520, an adding unit 530, an inter-plane/intra-plane predicting unit 540, an inter-frame motion compensating unit 550, and a deblocking filtering unit 560.

The inter-plane/intra-plane predicting unit 540 predicts blocks of a B plane according to modes predicted by the inter-plane/intra-plane predicting unit 210 of the B plane encoder 200, i.e., the inter-plane prediction mode, the intra-plane prediction mode or the mixed prediction mode.

For example, the inter-plane/intra-plane predicting unit 540 performs inter-plane prediction for the block of the B plane by any one of four calculation modes (vertical calculation mode, horizontal calculation mode, DC calculation mode, and diagonal down-left calculation mode) described above with reference to FIGS. 4A to 4D, i.e., a calculation mode calculated by the inter-plane/intra-plane predicting unit 210 of the B plane encoder 200, using pixels of the G plane reconstructed in the inter-plane prediction mode and pixels of the B plane reconstructed by the adding unit 530. The inter-plane/intra-plane predicting unit 540 performs the intra-plane prediction for the block of the B plane using pixels of the reconstructed B plane in the intra-plane prediction mode. The inter-plane/intra-plane predicting unit 540 performs inter-plane prediction for some of the sub-blocks of the B plane and performs intra-plane prediction for others by any one of four calculation modes (vertical calculation mode, horizontal calculation mode, DC calculation mode, and diagonal down-left calculation mode) described above with reference to FIGS. 4A to 4D, i.e., a calculation mode calculated by the inter-plane/intra-plane predicting unit 210 of the B plane encoder 200, using pixels of the C plane reconstructed in the mixed prediction mode and pixels of the B plane reconstructed by the adding unit 530. As described above, the inter-plane/intra-plane predicting unit 540 may know whether it is predicted by any one of the inter-plane prediction mode, the intra-plane prediction mode and the mixed prediction mode using a flag signal, for example, rem_intra8×8_pred_mode2, rem_intra8×8_pred_mode2 or mb_type from a bit stream, and may know whether the parameters of the weigh pixel prediction are calculated by any one of the four calculation modes.

The inter-frame motion compensating unit 550 compensates motion between a reference plane generated by the deblocking filtering unit 560 and a current plane. The inter-frame motion compensating unit 550 generates a prediction plane for the current plane from the reference plane using a motion vector used in the B plane encoder 200 by a block unit of size used in the B plane encoder 200.

The adding unit 530 sums an inter-plane predicted plane, an inter-frame predicted plane or a mixing predicted plane generated by the inter-plane/intra-plane predicting unit 540 or an inter-frame predicted plane generated by the intra-frame predicting unit 550 and a second residue to thereby reconstruct the B plane.

The R plane decoder 600 will be described below. For convenience, descriptions for elements having the same function as that of the B plane decoder 500 are omitted.

The R plane decoder 600 includes an entropy decoding unit 610, a dequantizing/inverse transforming unit 620, an adding unit 630, an inter-plane/intra-plane predicting unit 640, an inter-frame motion compensating unit 650, and a deblocking filtering unit 660.

The inter-plane/intra-plane predicting unit 640 predicts blocks of the B plane according to modes predicted by the inter-plane/intra-plane predicting unit 310 of the B plane encoder 300, i.e., the inter-plane prediction mode, the intra-plane prediction mode or the mixed prediction mode.

For example, the inter-plane/intra-plane predicting unit 640 performs inter-plane prediction for the block of the R plane by any one of four calculation modes (vertical calculation mode, horizontal calculation mode, DC calculation mode, and diagonal down-left calculation mode) described above with reference to FIGS. 4A to 4D, i.e., a calculation mode calculated by the inter-plane/intra-plane predicting unit 310 of the R plane encoder 300, using pixels of the block of the G (or B) plane reconstructed in the inter-plane prediction mode and pixels of the block of the R plane reconstructed by the adding unit 630. The inter-plane/intra-plane predicting unit 640 performs the intra-plane prediction for the block of the R plane using pixels of the block of the reconstructed R plane in the intra-plane prediction mode. The inter-plane/intra-plane predicting unit 640 performs inter-plane prediction for some of the sub-blocks of the R plane and performs intra-plane prediction for others by any one of four calculation modes (vertical calculation mode, horizontal calculation mode, DC calculation mode, and diagonal down-left calculation mode) described above with reference to FIGS. 4A to 4D, i.e., a calculation mode calculated by the inter-plane/intra-plane predicting unit 310 of the B plane encoder 300, using pixels of the G (or B) plane reconstructed in the mixed prediction mode and pixels of the R plane reconstructed by the adding unit 630.

The inter-frame motion compensating unit 650 compensates motion between a reference plane generated by the deblocking filtering unit 660 and a current plane. The inter-frame motion compensating unit 650 generates a prediction plane for the current plane from the reference plane using a motion vector used in the R plane encoder 300 by a block unit of size used in the R plane encoder 300.

The adding unit 630 sums an inter-plane predicted plane, an inter-frame predicted plane or a mixing predicted plane generated by the inter-plane/intra-plane predicting unit 640 or an inter-frame predicted plane generated by the intra-frame predicting unit 650 and a second residue to thereby reconstruct the R plane.

According to an exemplary embodiment, since an encoder is included for each plane, a parallel process may be basically performed and encoding speed may increase in a case where the correlation between one plane and other plane are not used.

Certain embodiments described above may prevent the deterioration of image quality caused by the change between the RGB color space signal and the YCbCr color space by using the RGB plane, and thus may be suitable for a high fidelity video field such as a digital cinema, medical video and digital video archiving. Certain embodiments described above may enhance the compression rate by encoding a plane using the correlation between the B plane and the R plane, in addition to the correlation between the G plane and the B plane and the correlation between the G plane and the R plane.

In weighted pixel prediction using the correlation between each plane, certain embodiments described above need not transmit a weighted pixel prediction parameter separately by using peripheral pixels. Accordingly, the compression efficiency may be enhanced.

The methods described above including encoding and decoding methods may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A video encoding method for encoding first to third planes having different color components, the video encoding method comprising:
   performing intra prediction in the first plane or inter prediction for a block of the first plane, and generating a first residue corresponding to a difference between the block of the first plane and the predicted block of the first plane;
   predicting a block of the second plane using a reconstructed pixel peripheral to the block of the second plane and a reconstructed pixel peripheral to the block of the first plane corresponding to the block of the second plane, without referring to any pixel within the block of the first plane, and generating a second residue corresponding to a difference between the block of the second plane and the predicted block of the second plane;
   predicting a block of the third plane using a reconstructed pixel peripheral to the block of the third plane and any one of a reconstructed pixel peripheral to the block of the first plane corresponding to the block of the third plane and a reconstructed pixel peripheral to the block of the second plane corresponding to the block of the third plane, and generating a third residue corresponding to a difference between the block of the third plane and the predicted block of the third plane; and
   encoding the first to third residues, respectively.

2. The video encoding method of claim 1, wherein the first plane is a green (G) plane, the second plane is a blue (B) plane, and the third plane is a red (R) plane.

3. The video encoding method of claim 1, wherein the first plane is a Y plane, the second plane is a Z plane, and the third plane is an X plane.

4. The video encoding method of claim 1, further comprising:
   performing another intra prediction in the second plane or another inter prediction for another block of the second plane, and generating a fourth residue corresponding to a difference between the other block of the second plane and the other intra or inter predicted block of the second plane;
   encoding the fourth residue; and
   selecting any one of the encoded second residue and the encoded fourth residue.

5. The video encoding method of claim 1, further comprising:
   performing another intra prediction in the third plane or another inter prediction for another block of the third plane, and generating a fourth residue corresponding to a difference between the other block of the third plane and the other intra or inter predicted block of the third plane;
   encoding the fourth residue; and
   selecting any one of the encoded third residue and the encoded fourth residue.

6. A video encoding method, comprising:
   performing intra prediction in a first plane or inter prediction for a block of the first plane, and generating a first residue corresponding to a difference between a block of the first plane and the predicted block of the first plane;
   predicting a first block of a second plane using a reconstructed pixel peripheral to the first block of the second plane and a reconstructed pixel peripheral to the block of the first plane corresponding to the reconstructed pixel peripheral to the first block of the second plane, without referring to any pixel within the block of the first plane;
   generating a second residue corresponding to a difference between the first block of the second plane and the predicted first block of the second plane; and
   encoding the first and second residues.

7. The video encoding method of claim 6, wherein the predicting of the first block of the second plane further comprises predicting the first block of the second plane using the following equation, $$F(P)=w \times P+o,$$

where w is a weighting value, o is a offset value, and P is a pixel value of the first block of the second plane.

8. The video encoding method of claim 7, wherein the predicting of the first block of the second plane further comprises calculating the weighting value (w) and the offset value (o) using the 2N number of the peripheral pixels in positions of (x+1, y) to (x+N, y) and positions of (x+1, y−1) to (x+N, y−1), in the first plane and the second plane, when the first block comprises the N×N number of pixels in positions of (x+1, y+1) to (x+N, y+N).

9. The video encoding method of claim 7, wherein the predicting of the first block of the second plane further comprises calculating the weighting value (w) and the offset value (o) using the 2N number of the peripheral pixels in positions of (x, y+1) to (x, y+N) and positions of (x−1, y+1) to (x−1, y+N), in the first plane and the second plane, when the first block comprises the N×N number of pixels in positions of (x+1, y+1) to (x+N, y+N).

10. The video encoding method of claim 7, wherein the predicting of the first block of the second plane further comprises calculating the weighting value (w) and the offset value (o) using the 2N+1 number of the peripheral pixels in positions of (x, y) to (x+N, y) and positions of (x, y+1) to (x, y+N), in the first plane and the second plane, when the first block comprises the N×N number of pixels in positions of (x+1, y+1) to (x+N, y+N).

11. The video encoding method of claim 7, wherein the predicting of the first block of the second plane further comprises calculating the weighting value (w) and the offset value (o) using the 2N−1 number of the peripheral pixels in positions of (x+1, y) to (x+2N−1, y), in the first plane and the second plane, when the first block comprises the N×N number of pixels in positions of (x+1, y+1) to (x+N, y+N).

12. The video encoding method of claim 6, wherein when the second block of the second plane is divided into a plurality of sub-blocks, the video encoding method further comprises:
performing intra prediction in the second plane for a first sub-block of plural sub-blocks;
predicting a second sub-block of the second plane using a reconstructed pixel peripheral to the second sub-block of the second plane and a reconstructed pixel peripheral to a sub-block of the first plane corresponding to the reconstructed pixel peripheral to the second sub-block of the second plane; and
generating a second residue corresponding to a difference between a second block of the second plane and the predicted second sub-block of the second plane, and encoding the second residue.

13. A non-transitory computer-readable storage medium storing a program to execute a video encoding method, comprising instructions to cause a computer to:
perform intra prediction in the first plane or inter prediction for a block of the first plane, and generate a first residue corresponding to a difference between the block of the first plane and the predicted block of the first plane;
predicting a block of the second plane using a reconstructed pixel peripheral to the block of the second plane and a reconstructed pixel peripheral to the block of the first plane corresponding to the block of the second plane, without referring to any pixel within the block of the first plane, and generating a second residue corresponding to a difference between the block of the second plane and the predicted block of the second plane;
predict a block of the third plane using a reconstructed pixel peripheral to the block of the third plane and any one of a reconstructed pixel peripheral to the block of the first plane corresponding to the block of the third plane and a reconstructed pixel peripheral to the block of the second plane corresponding to the block of the third plane, and generate a third residue corresponding to a difference between the block of the third plane and the predicted block of the third plane; and
encode the first to third residues, respectively.

14. A video encoding apparatus for encoding first and second planes having different color components, the video encoding apparatus comprising:
a first plane encoder which encodes the first plane; and
a second plane encoder which encodes the second plane, wherein the second encoder comprises:
an inter-plane/intra-plane predicting unit which performs any one of an inter-plane prediction mode, an intra-plane prediction mode and a mixed prediction mode, wherein the inter-plane prediction mode is predicting a first block of the second plane using a reconstructed pixel peripheral to the first block of the second plane and a pixel peripheral to a block of the first plane corresponding to the first block of the second plane without referring to any pixel within the block of the first plane, and the intra-plane prediction mode is performing intra prediction in the second plane for the first block of the second plane, and the mixed prediction mode is predicting a sub-block of the first block of the second plane adaptively either in the inter-plane prediction mode or in the intra-plane prediction mode;
an inter-frame predicting unit which performs inter prediction for the first block of the second plane;
a subtracting unit which generates a residue corresponding to a difference between the first block of the second plane and the predicted first block of the second plane, wherein the predicted first block is predicted by the inter-plane/intra-plane predicting unit or the inter-frame predicting unit; and
an encoding unit which encodes the residue.

15. The video encoding apparatus of claim 14, wherein the second plane encoder transmits a flag informing whether one of the inter-plane prediction mode, the intra-plane 20 prediction mode and the mixed prediction mode is performed.

16. The video encoding apparatus of claim 14, wherein the first plane is a green (G) plane, the second plane is a blue (B) plane, and the third plane is a red (R) plane.

17. A video decoding method for decoding first to third planes having different color components from a bit stream, the video decoding method comprising:
generating a first residue from the bit stream, performing intra prediction or inter prediction for a block of the first plane from the first plane reconstructed, and summing the first residue and the predicted block of the first plane to reconstruct the block of the first plane;
generating a second residue from the bit stream, predicting a block of the second plane using a reconstructed pixel peripheral to the block of the second plane and a reconstructed pixel peripheral to the block of the first plane corresponding to the block of the second plane, without referring to any pixel within the block of the first plane, and summing the second residue and the predicted block of the second plane to reconstruct the block of the second plane; and
generating a third residue from the bit stream, predicting a block of the third plane using a reconstructed pixel peripheral to the block of the third plane and any one of a reconstructed pixel peripheral to the block of the first plane corresponding to the block of the third plane and a reconstructed pixel peripheral to the block of the second plane corresponding to the block of the third plane, and summing the third residue and the predicted block of the third plane to reconstruct the block of the third plane.

18. A video decoding apparatus for decoding first and second planes having different color components, the video decoding apparatus comprising:
a first plane decoder which decodes the first plane; and
a second plane decoder which decodes the second plane, wherein the second plane decoder comprises:
an inter-plane/intra-plane predicting unit which performs an inter-plane prediction mode which predicts a block of the second plane using a reconstructed pixel peripheral to the block of the second plane and a pixel peripheral to a block of the first plane corresponding to the block of the second plane, without referring to any pixel within the block of the first plane, an intra-plane prediction mode which performs intra prediction in the second plane for the block of the second plane, and a mixed prediction mode which predicts a sub-block of the block of the second plane adaptively either in the inter-plane prediction mode or in the intra-plane prediction mode;

an inter-frame predicting unit for performing inter prediction between each frame for the block of the second plane; and an adding unit for summing a residue, the block of the second plane and the predicted block of the second plane output from the inter-plane/intra-plane predicting unit or the interframe predicting unit to reconstruct the block of the second plane.

19. The video decoding apparatus of claim 18, wherein the inter-plane/intra-plane predicting unit performs any one of the inter-plane prediction mode, the intra-plane prediction mode and the mixed prediction mode according to a flag transmitted from a video encoding apparatus.

20. The video encoding method of claim 1, wherein the predicting the block of the second plane comprising:

calculating a weighting factor and an offset using a reconstructed pixel peripheral to the block of the second plane and a reconstructed pixel peripheral to the block of the first plane corresponding to the block of the second plane; and calculating the predicted block of the second plane using the weighting factor and the offset.

21. A video encoding method for encoding first to third planes having different color components, the video encoding method comprising:

determining one of first to six encoding operations based on a compression rate of each of the six encoding operations; and encoding the first to third planes using the determined encoding operation, wherein, the first encoding operation comprises encoding the first to third planes independently without referring to any of the other two planes;

the second encoding operation comprises encoding the second plane referring to the first plane while each of the first and third planes is encoded independently without referring to any of the other two planes;

the third encoding operation comprises encoding the third plane referring to the second plane while each of the first and second planes is encoded independently without referring to any of the other two planes;

the fourth encoding operation comprises encoding the third plane referring to the first plane while each of the first and second planes is encoded independently without referring to any of the other two planes;

the fifth encoding operation comprises encoding the second plane referring to the first plane and encoding the third plane referring to the second plane while the first plane is encoded without referring to any of the other two planes; and the sixth encoding operation comprises encoding the third plane referring to the second plane and encoding the second plane referring to the first plane while the first plane is encoded without referring to any of the other two planes.

* * * * *